United States Patent
Liao

(10) Patent No.: US 9,837,891 B2
(45) Date of Patent: Dec. 5, 2017

(54) POWER CIRCUIT, GATE DRIVING CIRCUIT AND DISPLAY MODULE

(71) Applicant: Sitronix Technology Corp., Hsinchu County (TW)

(72) Inventor: Min-Nan Liao, Hsinchu County (TW)

(73) Assignee: Sitronix Technology Corp., Hsinchu County (TW)

(*) Notice: Subject to any disclaimer, the term of this patent is extended or adjusted under 35 U.S.C. 154(b) by 151 days.

(21) Appl. No.: 14/883,650

(22) Filed: Oct. 15, 2015

(65) Prior Publication Data

US 2016/0294279 A1 Oct. 6, 2016

Related U.S. Application Data

(60) Provisional application No. 62/141,274, filed on Apr. 1, 2015.

(51) Int. Cl.
   *H02M 3/07* (2006.01)

(52) U.S. Cl.
   CPC ........ *H02M 3/07* (2013.01); *G09G 2330/021* (2013.01)

(58) Field of Classification Search
   CPC ......... G09G 2330/02; G09G 2330/021; G09G 2330/022; G09G 2330/023; G09G 2330/024; G09G 1/005; G09G 2310/0245; G09G 2310/063; G09G 2330/00; G09G 2330/025; G09G 2330/026; G09G 2330/027; G09G 2330/028; H02M 3/07

USPC ........................................................ 345/212
   See application file for complete search history.

(56) References Cited

U.S. PATENT DOCUMENTS

| | | | |
|---|---|---|---|
| 6,317,122 B1 | 11/2001 | Yamazaki | |
| 6,483,728 B1* | 11/2002 | Johnson | H02M 3/073 363/60 |
| 2009/0309820 A1* | 12/2009 | Chen | G09G 3/3677 345/87 |
| 2012/0169404 A1* | 7/2012 | Cook | H02M 3/07 327/536 |

FOREIGN PATENT DOCUMENTS

| | | |
|---|---|---|
| TW | 200505162 | 2/2005 |
| TW | 200632849 | 9/2006 |
| TW | 200807217 | 2/2008 |
| TW | 201315121 A1 | 4/2013 |
| TW | 201533719 A | 9/2015 |

* cited by examiner

*Primary Examiner* — Grant Sitta
(74) *Attorney, Agent, or Firm* — Winston Hsu

(57) ABSTRACT

A power circuit includes a first charge pump for converting a supply voltage into a first high voltage and a first low voltage, at least one second charge pump, each for increasing the first high voltage by a first variance value to a second high voltage, and at least one third charge pump, each for decreasing the first low voltage by a second variance value to a second low voltage. A difference between the first high and low voltages is less than a breakdown threshold. The second and third variance margins are less than the breakdown threshold.

11 Claims, 12 Drawing Sheets

POWER CIRCUIT, GATE DRIVING CIRCUIT AND DISPLAY MODULE

CROSS REFERENCE TO RELATED APPLICATIONS

This application claims the benefit of U.S. Provisional Application No. 62/141,274 filed on Apr. 1, 2015, the contents of which are incorporated herein.

BACKGROUND OF THE INVENTION

1. Field of the Invention

The present invention relates to a power circuit, gate driving circuit and display module, and more particularly, to a power circuit, gate driving circuit and display module which convert a supply voltage step by step without employing any high voltage endurance component.

2. Description of the Prior Art

Please refer to FIG. 1, which is a schematic diagram of a thin film transistor (TFT) LCD monitor 10 of the prior art. The LCD monitor 10 includes an LCD panel 100, a source driver 102, a gate driver 104, a voltage generator 106 and a logic control circuit 116. The LCD panel 100 is composed of two substrates, and space between the substrates is filled with liquid crystal materials. One of the substrates is installed with a plurality of data lines 108, a plurality of scan lines (or gate lines) 110 and a plurality of TFTs 112, and another substrate is installed with a common electrode for providing a common signal Vcom outputted by the voltage generator 106. The TFTs 112 are arranged as a matrix on the LCD panel 100. Accordingly, each data line 108 corresponds to a column of the LCD panel 100, each scan line 110 corresponds to a row of the LCD panel 100, and each TFT 112 corresponds to a pixel. Note that the LCD panel 100 composed of the two substrates can be regarded as an equivalent capacitor 114.

The source driver 102 and the gate driver 104 input signals to the corresponding data lines 108 and scan lines 110 based upon a desired image data, to control whether or not to enable the TFT 112 and a voltage difference between two ends of the equivalent capacitor 114, so as to change alignment of the liquid crystals as well as the penetration amount of light. As a result, the desired image data can be correctly displayed on the LCD panel 100. The logic control circuit 116 is utilized for coordinating the source driver 102 and the gate driver 104, such as calibrating timing of source driving signals on the data lines 108 and scan signals on the scan lines 110, such that the TFTs 112 can be enabled by the scan signals and receive correct image data via the source driving signals at correct time instances.

Based on manufacturing requirements, components of the driving circuits of the LCD monitor 10 are mainly classified into low voltage endurance components, medium voltage endurance components and high voltage endurance components. The low voltage endurance components are mainly employed in the logic control circuit 116, and an endurance limit for the low voltage endurance components is 1.5-1.8 V. The medium voltage endurance components are mainly employed in the source driver 102, and an endurance limit for the medium voltage endurance components is 5-6 V. The high voltage endurance components are mainly employed in the gate driver 104, and an endurance limit for the high voltage endurance components is 25-30 V. Among the three component categories, the high voltage endurance components require the largest layout area, the most masks and layers in the integrated circuit, and therefore cost the most.

In addition, the high voltage endurance components have to be driven by a high voltage power circuit, such as a charge pump. For example, please refer to FIG. 2, which is a schematic diagram of a high voltage power circuit 20 of the prior art. The high voltage power circuit 20 includes a double voltage charge pump 201 and triple voltage charge pumps 202, 203. The double voltage charge pump 201 converts a supply voltage VDDO of 2.5 V into output voltages V1, V2 of 5 V and 0 V respectively. The triple voltage charge pump 202 converts the output voltages V1, V2 into output voltages V3, V4 of 15 V and 0 V respectively. The triple voltage charge pump 203 converts the output voltages V1, V2 into output voltages V5, V6 of 5 V and −10 V respectively. Since voltage ranges of the triple voltage charge pumps 202, 203 reach 15 V, the triple voltage charge pumps 202, 203 have to be implemented by high voltage endurance components, which is disadvantageous for saving manufacturing time and cost.

SUMMARY OF THE INVENTION

It is therefore a primary objective of the claimed invention to provide a power circuit and the related gate driving circuit and display module.

The present invention discloses a power circuit, comprising a first charge pump, for converting a supply voltage into a first high voltage and a first low voltage, wherein the first high voltage is equal to the supply voltage plus a first voltage variance, the first low voltage is equal to the supply voltage minus a fourth voltage variance, and a voltage difference between the first high voltage and the first low voltage is less than a medium voltage device endurance limit; a second charge pump, electrically coupled to the first charge pump, for enhancing the first high voltage to generate a second high voltage, wherein the second high voltage is equal to the first high voltage plus a second voltage variance; and a third charge pump, electrically coupled to the first charge pump, for weakening the first low voltage to generate a second low voltage, wherein the second low voltage is equal to the first low voltage minus a third voltage variance; wherein the second voltage variance and the third voltage variance are less than the medium voltage device endurance limit.

The present invention further discloses a gate driving circuit, for providing a scan signal to an LCD panel, the gate driving circuit comprising a P-type transistor, comprising a gate end, for receiving a control signal; a source end, for receiving a positive supply voltage; and a drain end, electrically coupled to the LCD panel, for outputting the scan signal; an N-type transistor, comprising: a gate end, for receiving the control signal; a source end, for receiving a negative supply voltage; and a drain end, electrically coupled to the drain end of the P-type transistor; and a power circuit, comprising a first charge pump, for converting a supply voltage into a first high voltage and a first low voltage, wherein the first high voltage is equal to the supply voltage plus a first voltage variance, the first low voltage is equal to the supply voltage minus a fourth voltage variance, and a voltage difference between the first high voltage and the first low voltage is less than a medium voltage device endurance limit; a second charge pump, electrically coupled to the first charge pump and the source end of the P-type transistor, for enhancing the first high voltage to generate a second high voltage, wherein the second high voltage is equal to the first high voltage plus a second voltage variance; and a third charge pump, electrically coupled to the first charge pump and the source end of the N-type transistor, for weakening the first low voltage to generate a second low voltage, wherein the second low voltage is equal to the first low voltage minus a third voltage variance; wherein the second voltage variance and the third voltage variance are less than the medium voltage device endurance limit.

The present invention further discloses a display module, comprising an LCD panel; and a gate driving circuit, comprising: a P-type transistor, comprising a gate end, for receiving a control signal; a source end, for receiving a positive supply voltage; and a drain end, electrically coupled to the LCD panel, for outputting a scan signal to the LCD panel; an N-type transistor, comprising a gate end, for receiving the control signal; a source end, for receiving a negative supply voltage; and a drain end, electrically coupled to the drain end of the P-type transistor; and a power circuit, comprising a first charge pump, for converting a supply voltage into a first high voltage and a first low voltage, wherein the first high voltage is equal to the supply voltage plus a first voltage variance, the first low voltage is equal to the supply voltage minus a fourth voltage variance, and a voltage difference between the first high voltage and the first low voltage is less than a medium voltage device endurance limit; a second charge pump, electrically coupled to the first charge pump and the source end of the P-type transistor, for enhancing the first high voltage to generate a second high voltage, wherein the second high voltage is equal to the first high voltage plus a second voltage variance; and a third charge pump, electrically coupled to the first charge pump and the source end of the N-type transistor, for weakening the first low voltage to generate a second low voltage, wherein the second low voltage is equal to the first low voltage minus a third voltage variance; wherein the second voltage variance and the third voltage variance are less than the medium voltage device endurance limit.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
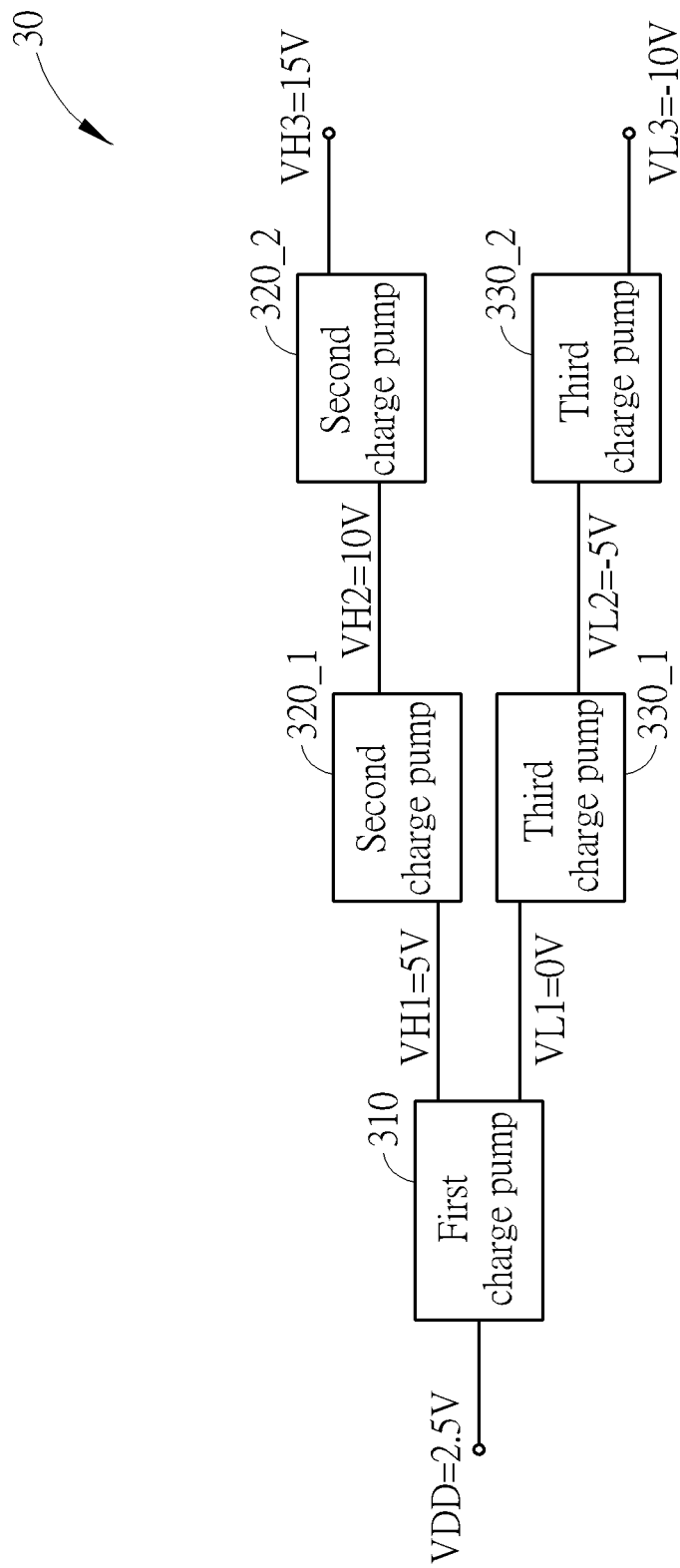
FIG. 3 is a schematic diagram of a power circuit according to an embodiment of the present invention.

Please refer to FIG. 3, which is a schematic diagram of a power circuit 30 according to an embodiment of the present invention. The power circuit 30 includes a first charge pump 310, second charge pumps 320_1, 320_2 and third charge pumps 330_1, 330_2. The first charge pump 310 is utilized for converting a supply voltage VDD into a first high voltage VH1 and a first low voltage VL1. The first high voltage VH1 is equal to the supply voltage VDD plus a first voltage variance $\Delta$V1, and the first low voltage VL1 is equal to the supply voltage VDD minus a fourth voltage variance $\Delta$V4, i.e. VH1=VDD+$\Delta$V1, VL1=VDD−$\Delta$V4. A voltage difference between the first high voltage VH1 and the first low voltage VL1 is less than a medium voltage device endurance limit Vr, e.g. Vr=6 V, such that VH1−VL1=$\Delta$V1+$\Delta$V4<6 V. The second charge pump 320_1 is utilized for converting the first high voltage VH1 into a second high voltage VH2, and the second charge pump 320_2 is utilized for converting the second high voltage VH2 into a third high voltage VH3. The second high voltage VH2 is equal to the first high voltage VH1 plus a second voltage variance $\Delta$V2, and the third high voltage VH3 is equal to the second high voltage VH2 plus the second voltage variance $\Delta$V2, i.e. VH2=VH1+$\Delta$V2, VH3=VH2+$\Delta$V2. The third charge pump 330_1 is utilized for converting the first low voltage VL1 into a second low voltage VL2, and the third charge pump 330_2 is utilized for converting the second low voltage VL2 into a third low voltage VL3. The second low voltage VL2 is equal to the first low voltage VL1 minus a third voltage variance $\Delta$V3, and the third low voltage VL3 is equal to the second low voltage VL2 minus the third voltage variance $\Delta$V3, i.e. VL2=VL1−$\Delta$V3, VL3=VL2−$\Delta$V3. Note that, the second voltage variance $\Delta$V2 and the third voltage $\Delta$V3 are less than the medium voltage device endurance limit Vr.

In short, all voltage differences among transistor terminals of the first charge pump 310, the second charge pumps 320_1, 320_2 and the third charge pumps 330_1, 330_2 are less than the medium voltage device endurance limit Vr=6 V. As a result, the power circuit 30 can be implemented all by medium and low voltage endurance components instead of the high voltage endurance components employed in the high voltage power circuit 20, so as to save manufacturing cost and time. On the other hand, a multiple stage structure is employed in the power circuit 30, which converts the supply voltage VDD step by step instead of a full voltage conversion by one time, such that the high voltage endurance components are no longer required.

Figure 4:
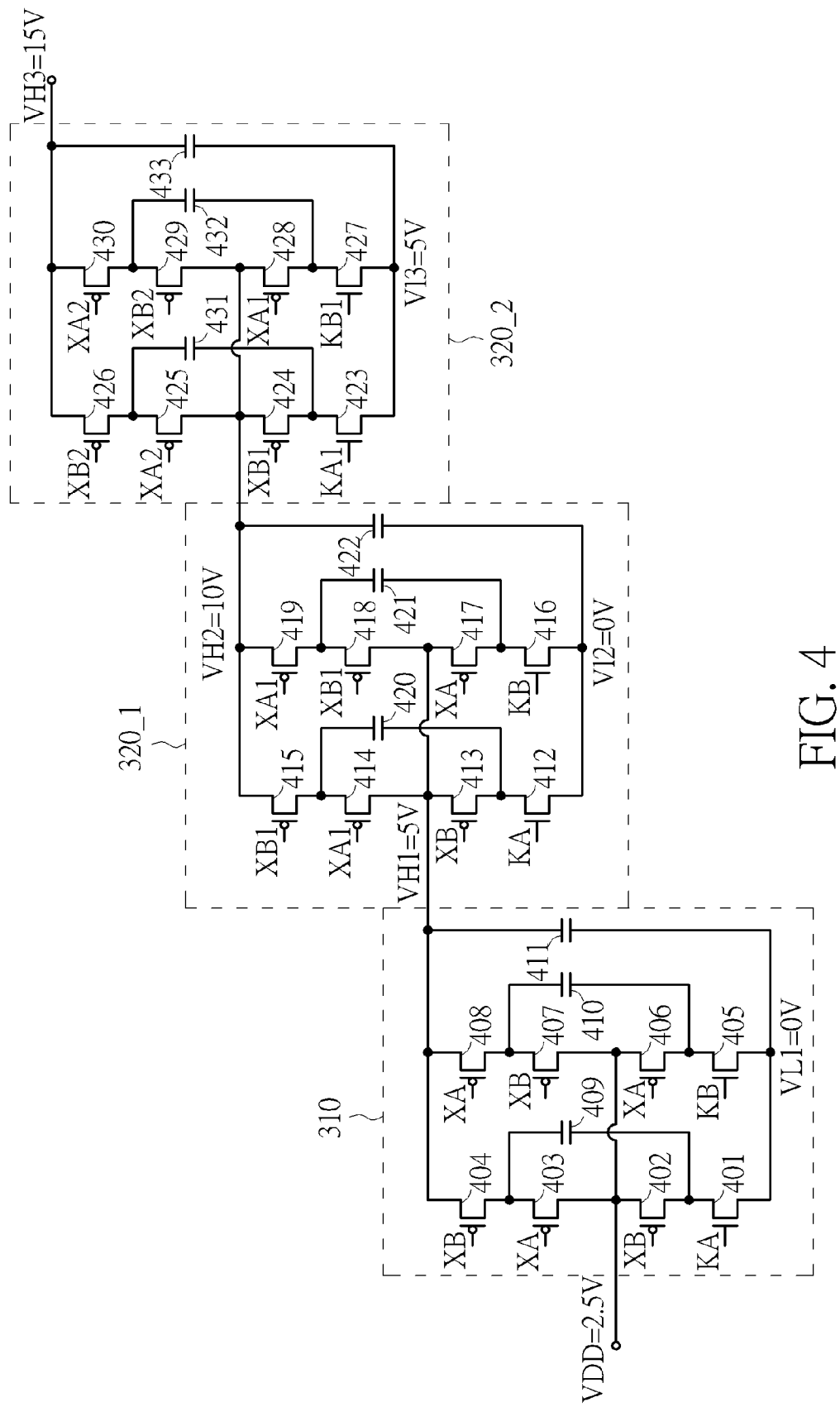
FIG. 4 is a schematic diagram of a first charge pump and two second charge pumps of the power circuit of FIG. 3.
Figure 5:
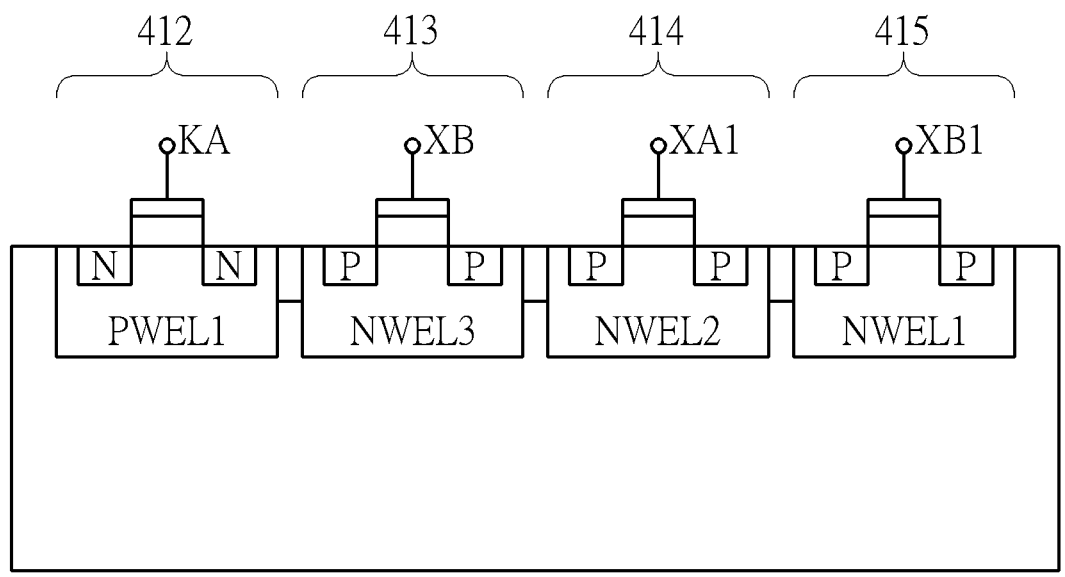
FIG. 5 is a cross-sectional view of N-type and P-type transistors of the second charge pump of FIG. 4.
Figure 6:
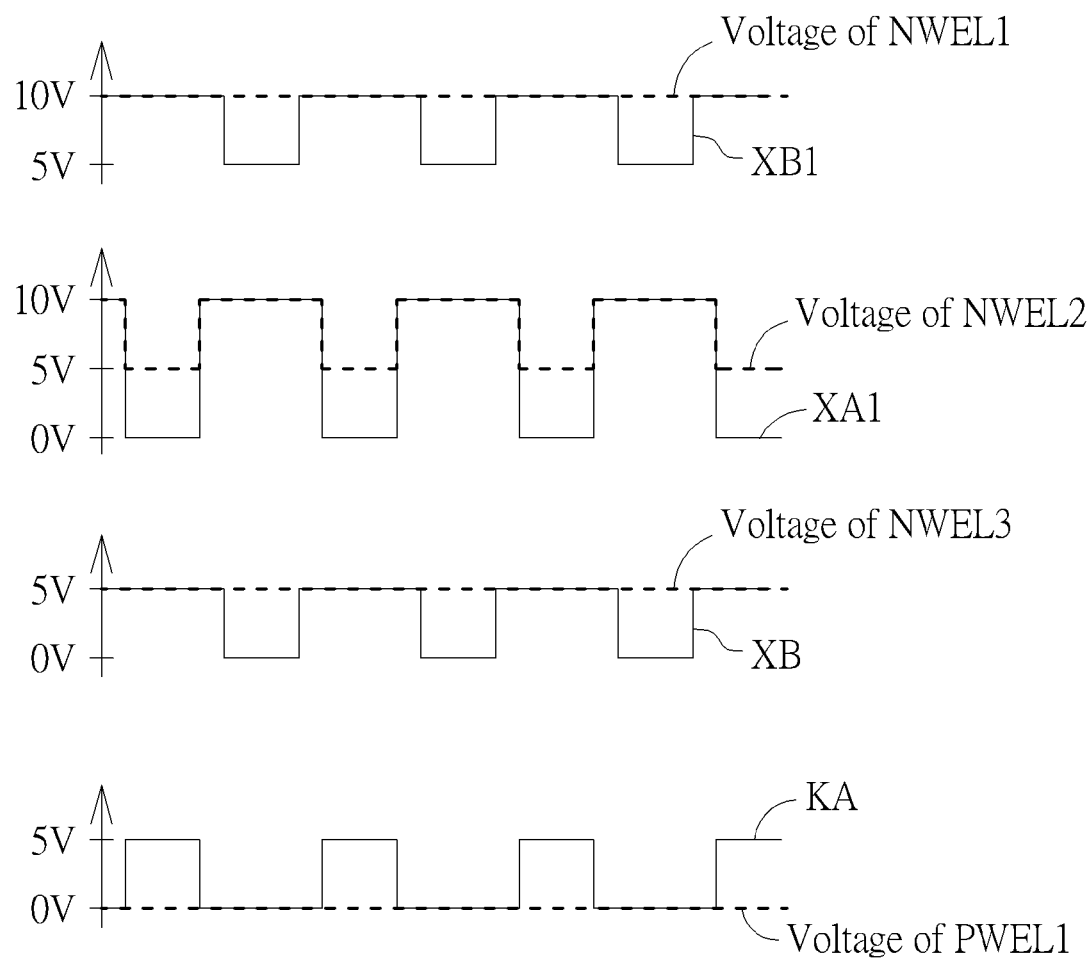
FIG. 6 is a time-variant diagram of terminal voltages of the N-type and P-type transistors of FIG. 5.

In detail, please refer to FIG. 4, which is a schematic diagram of the first charge pump 310 and the second charge pumps 320_1, 320_2. The first charge pump 310 includes N-type transistors 401, 405, P-type transistors 402-404, 406-408 and capacitors 409-411. The second charge pump 320_1 includes N-type transistors 412, 416, P-type transistors 413-415, 417-419 and capacitors 420-422. The second charge pump 320_2 includes N-type transistors 423, 427, P-type transistors 424-426, 428-430 and capacitors 431-433. The transistors of the first charge pump 310 and the second charge pumps 320_1, 320_2 are controlled by control signals KA, KB, XA, XB, XA1, XB1, XA2, XB2. Please also refer to FIG. 5 and FIG. 6. FIG. 5 is a cross-sectional view of the N-type transistor 412 and the P-type transistors 413-415. FIG. 6 is a time-variant diagram of terminal voltages of the N-type transistor 412 and the P-type transistors 413-415. According to FIG. 6, voltage difference between the control signals KA, XB, XA1, XB1 and base voltages of the N-type transistor 412 and the P-type transistors 413-415 are less than 6 V, and therefore the N-type transistor 412 and the P-type transistors 413-415 can be implemented by the medium voltage endurance components. In addition to the embodiment illustrated in FIG. 6, terminal voltage differences among other transistors of FIG. 4 are less than 6 V, and the transistors also can be implemented by the medium voltage endurance components.

In respect of operations of the first charge pump 310 and the second charge pumps 320_1, 320_2, taking the second charge pump 320_1 for example, the control signals KA, KB, XA, XB, XA1, XB1 are respectively provided to gate ends of the N-type and P-type transistors. The capacitor 420 includes one end electrically coupled to a drain end of the P-type transistor 413 and a drain end of the N-type transistor 412 and the other end electrically coupled to a source end of the P-type transistor 414 and a drain end of the P-type transistor 415. The capacitor 421 includes one end electrically coupled to a drain end of the P-type transistor 417 and a drain end of the N-type transistor 416 and the other end electrically coupled to a source end of the P-type transistor 418 and a drain end of the P-type transistor 419. The capacitor 422 includes one end electrically coupled to source ends of the N-type transistors 412, 416 and the other end electrically coupled to source ends of the P-type transistors 415, 419. Therefore, when the control signals KA, XB, XB1 represent logic "1" and the control signals KB, XA, XA1 represent logic "0", the N-type transistor 412 and the P-type transistors 414, 417, 419 are enabled, the N-type transistor 416 and the P-type transistors 413, 415, 418 are disabled, the capacitor 420 stores charges, and the capacitor 421 outputs charges. On the contrary, when the control signals KA, XB, XB1 represent logic "0" and the control signals KB, XA, XA1 represent logic "1", the N-type transistor 412 and the P-type transistors 414, 417, 419 are disabled, the N-type transistor 416 and the P-type transistors 413, 415, 418 are enabled, the capacitor 421 stores charges, and the capacitor 420 outputs charges. Similarly, the first charge pump 310 and the second charge pump 320_2 also can be operated in the same manner. In such a situation, since voltage differences between the control signals KA, KB, XA, XB, XA1, XB1 and base voltages of the N-type transistors 412, 416 and the P-type transistors 413-415, 417-419 are designed to be less than 6 V, the N-type transistors 412, 416 and the P-type transistors 413-415, 417-419 can be implemented by the medium voltage endurance components.

Figure 7:
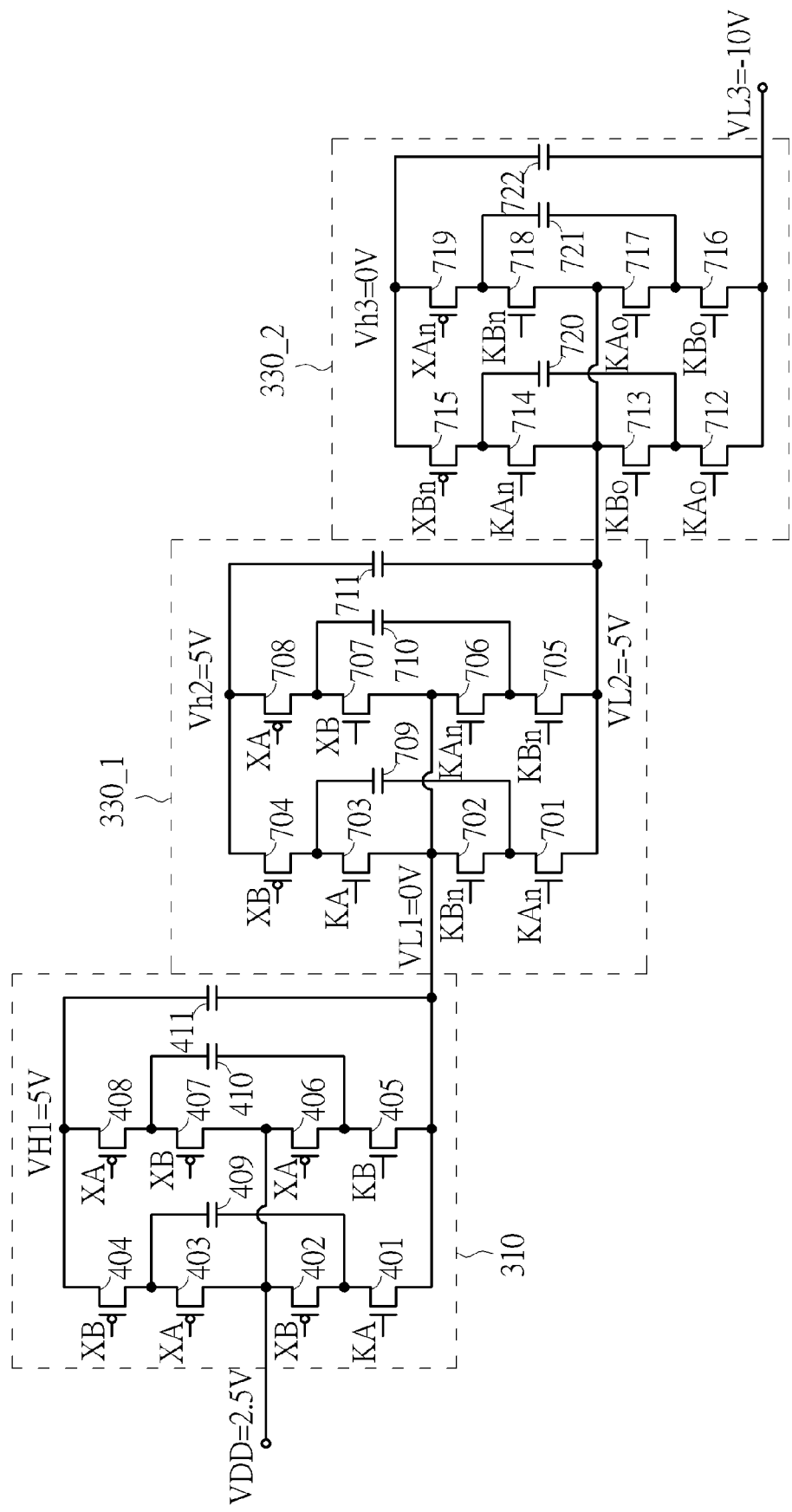
FIG. 7 is a schematic diagram of a first charge pump and two third charge pumps of the power circuit of FIG. 3.
Figure 8:
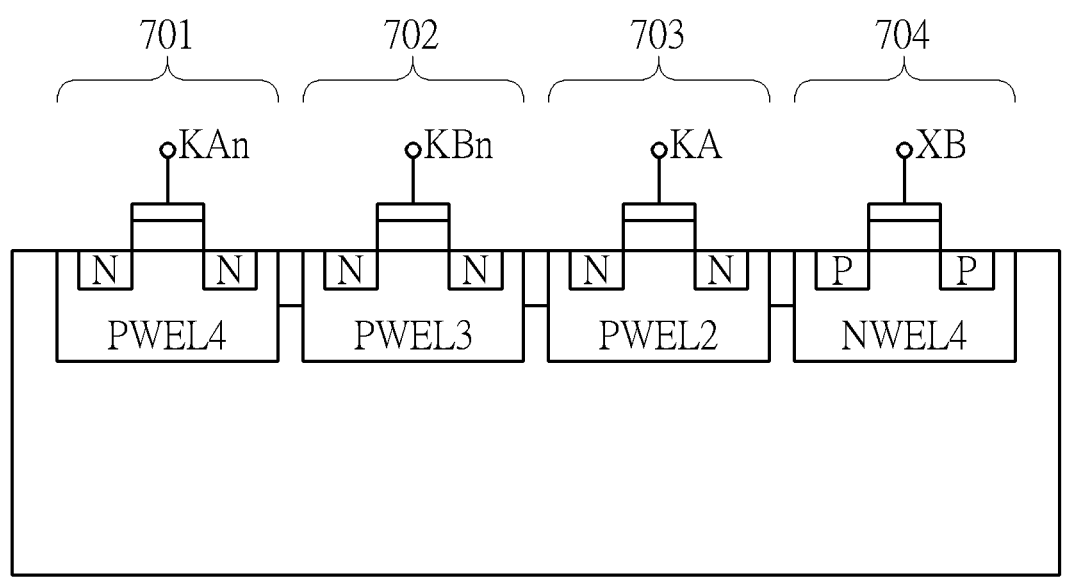
FIG. 8 is a cross-sectional view of N-type and P-type transistors of the third charge pump of FIG. 7.
Figure 9:
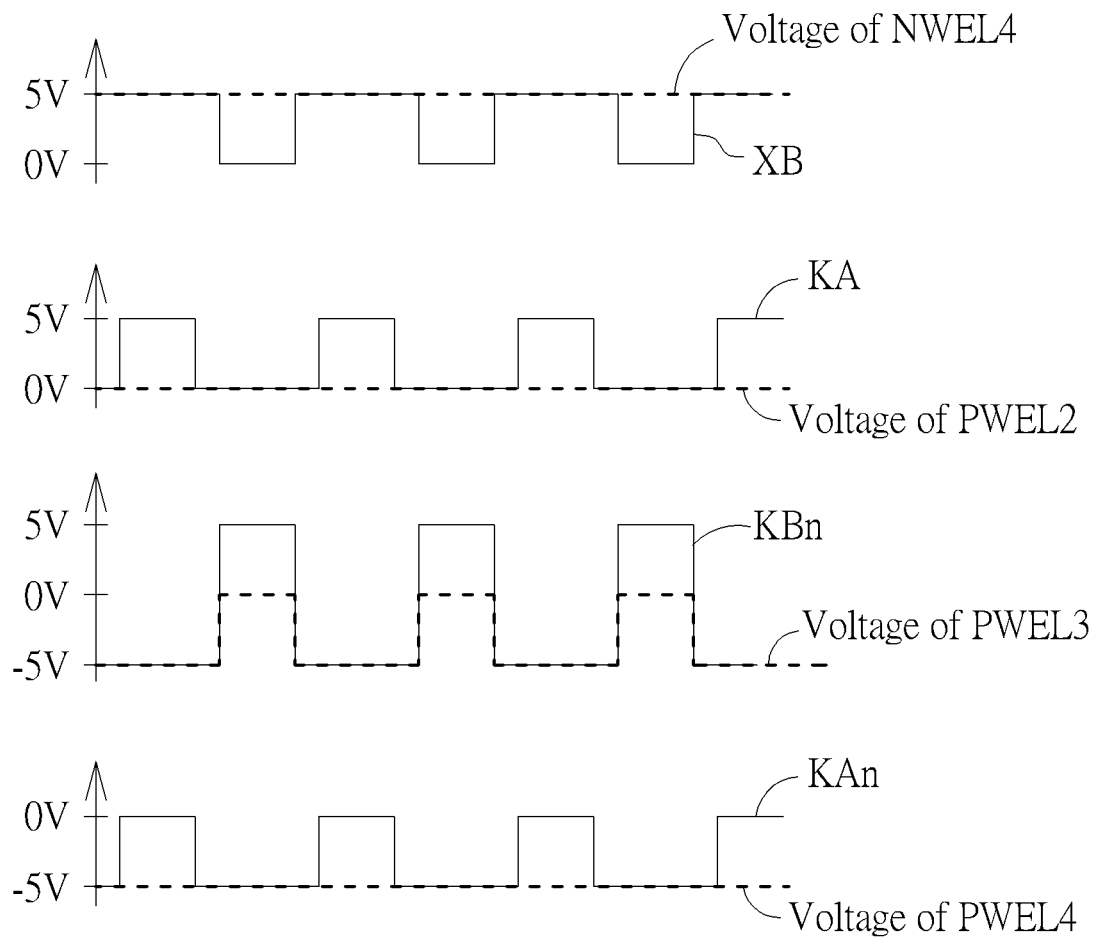
FIG. 9 is a time-variant diagram of terminal voltages of the N-type and P-type transistors of FIG. 8.

In addition, please refer to FIG. 7, which is a schematic diagram of the first charge pump 310 and the third charge pumps 330_1, 330_2. The third charge pump 330_1 includes N-type transistors 701-703, 705-707, P-type transistors 704, 708 and capacitors 709-711. The third charge pump 330_2 includes N-type transistors 712-714, 716-718, P-type transistors 715, 719 and capacitors 720-722. The transistors of the first charge pump 310 and the third charge pumps 330_1, 330_2 are controlled by control signals KA, KB, XA, XB, KAn, KBn, Kao, KBo, XAn, XBn. Please also refer to FIG. 8 and FIG. 9. FIG. 8 is a cross-sectional view of the N-type transistors 701-703 and the P-type transistor 704 of the third charge pump 330_1. FIG. 9 is a time-variant diagram of terminal voltages of the N-type transistors 701-703 and the P-type transistor 704. According to FIG. 9, voltage differences between the control signals KAn, KBn, KA, XB and base voltages of the N-type transistors 701-703 and the P-type transistor 704 are less than 6 V, and therefore the N-type transistors 701-703 and the P-type transistor 704 can be implemented by the medium voltage endurance components. In addition to the embodiment of FIG. 9, terminal voltage differences among other transistors of FIG. 7 are also less than 6 V, the transistors can be implemented by medium voltage endurance components as well.

Figure 10:
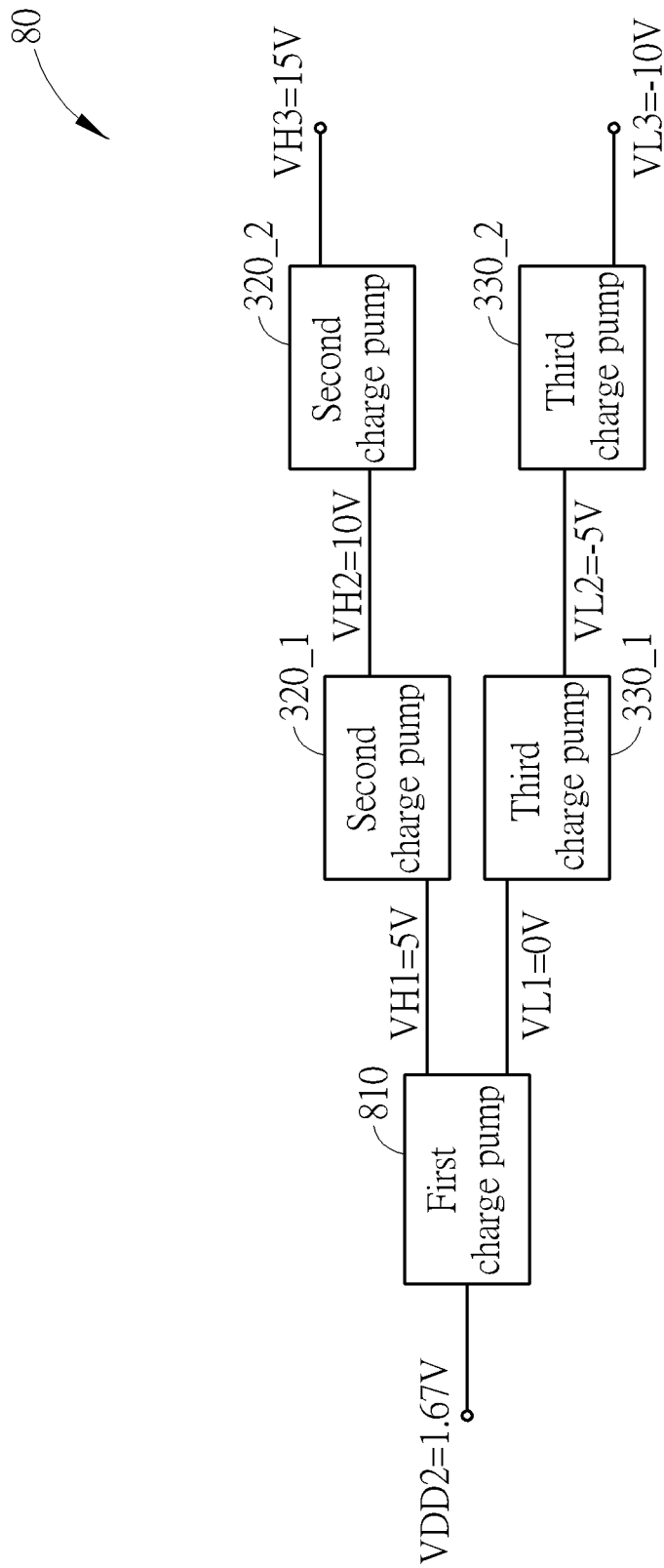
FIG. 10 is a schematic diagram of a power circuit according to an embodiment of the present invention.

Note that, FIG. 3 illustrates a three stage circuit structure implemented by double voltage charge pumps, and a skilled person in the art can modify the structure based on practical requirements. For example, please refer to FIG. 10, which is a schematic diagram of a power circuit 80 according to an embodiment of the present invention. The power circuit 80 is derived from the power circuit 30, and therefore identical components are labeled by the same symbols. In comparison with the power circuit 30, the power circuit 80 features a triple voltage first charge pump 810 and a supply voltage VDD2 of 1.67 V. The first charge pump 810 is utilized for converting the supply voltage VDD2 into a first high voltage VH1 of 5 V and a first low voltage VL1 of 0 V.

Figure 11:
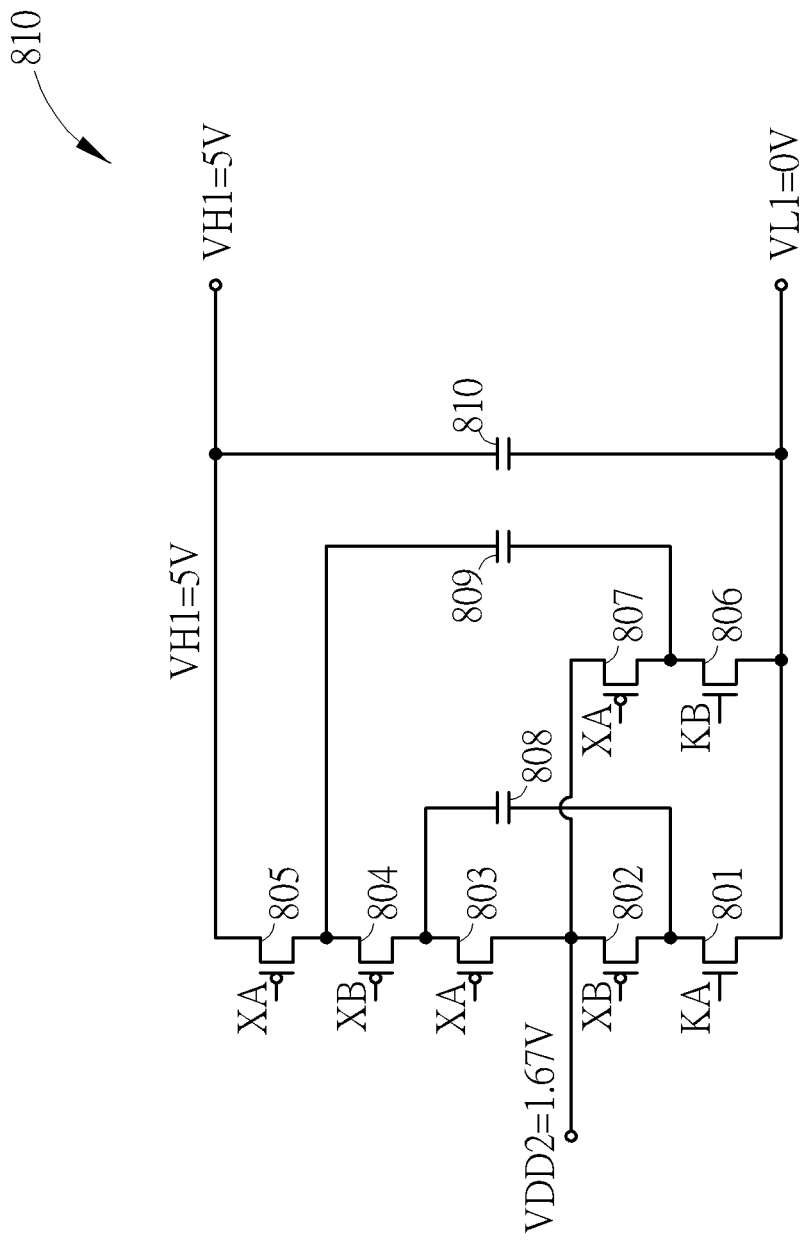
FIG. 11 is a schematic diagram of a first charge pump of the power circuit of FIG. 10.

In detail, please refer to FIG. 11, which is a schematic diagram of a first charge pump 810. The first charge pump 810 includes N-type transistors 801, 806, P-type transistors 802-805, 807 and capacitors 808-810. The transistors 801-807 are controlled by control signals KA, KB, XA, XB. As can be seen in FIG. 11, even though the first charge pump 810 is a triple voltage charge pump, all terminal voltage differences among the transistors of the first charge pump 810 are less than 6 V since a voltage difference between the first high voltage VH1 and the first low voltage VL1 is designed to be less than the medium voltage device endurance limit Vr=6 V. As a result, the first charge pump 810 can be implemented all by the medium voltage endurance components.

In other words, as long as the voltage difference between the first high voltage VH1 and the first low voltage VL1 is less than 6 V, the first charge pumps 310, 810 no longer have to be implemented by the high voltage endurance components, which means the employed component type is not determined based on the circuit structure. Similarly, as long as the second voltage variance ΔV2 and the third voltage variance ΔV are less than 6 V, the second charge pumps 320_1, 320_2 and the third charge pumps 330_1, 330_2 have no need to employ the expensive high voltage endurance components.

Figure 1:
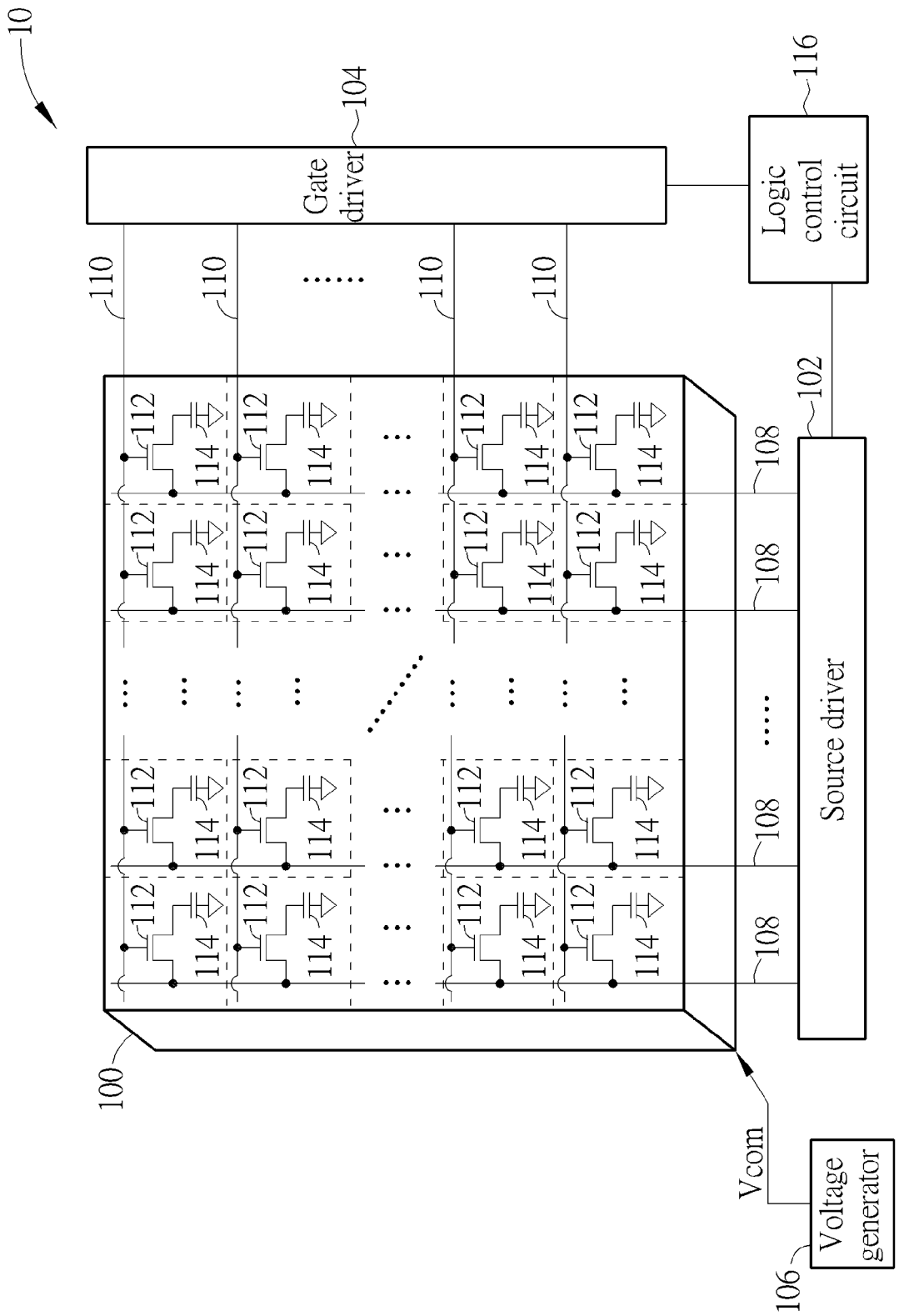
FIG. 1 is a schematic diagram of an LCD monitor of the prior art.
Figure 2:
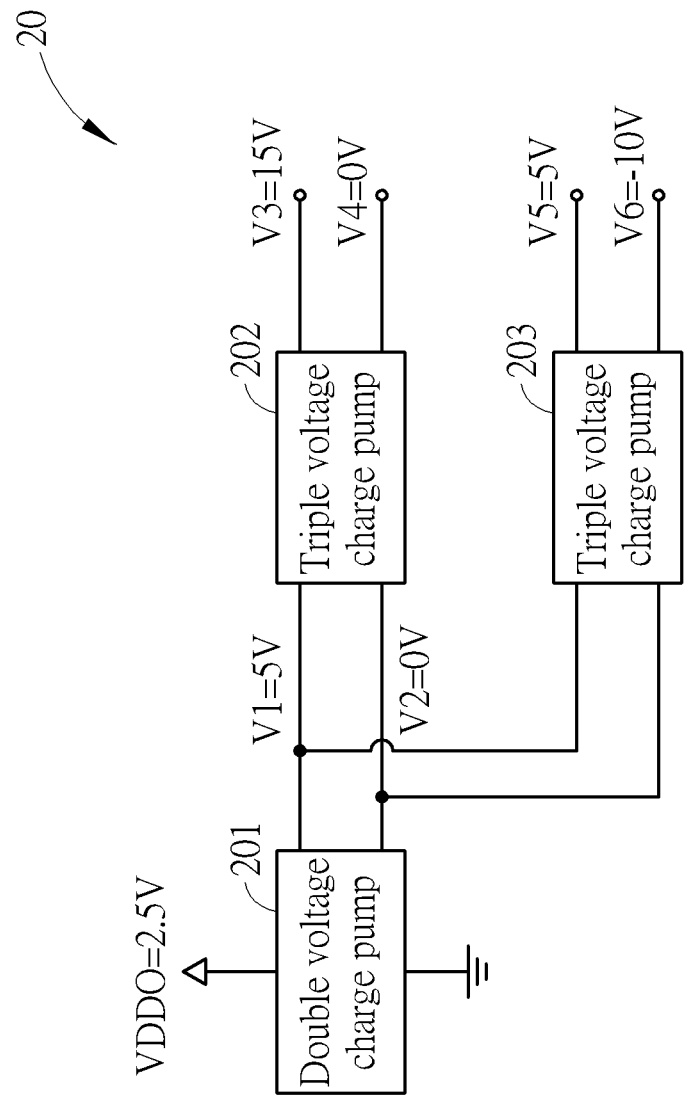
FIG. 2 is a schematic diagram of a high voltage power circuit of the prior art.
Figure 12:
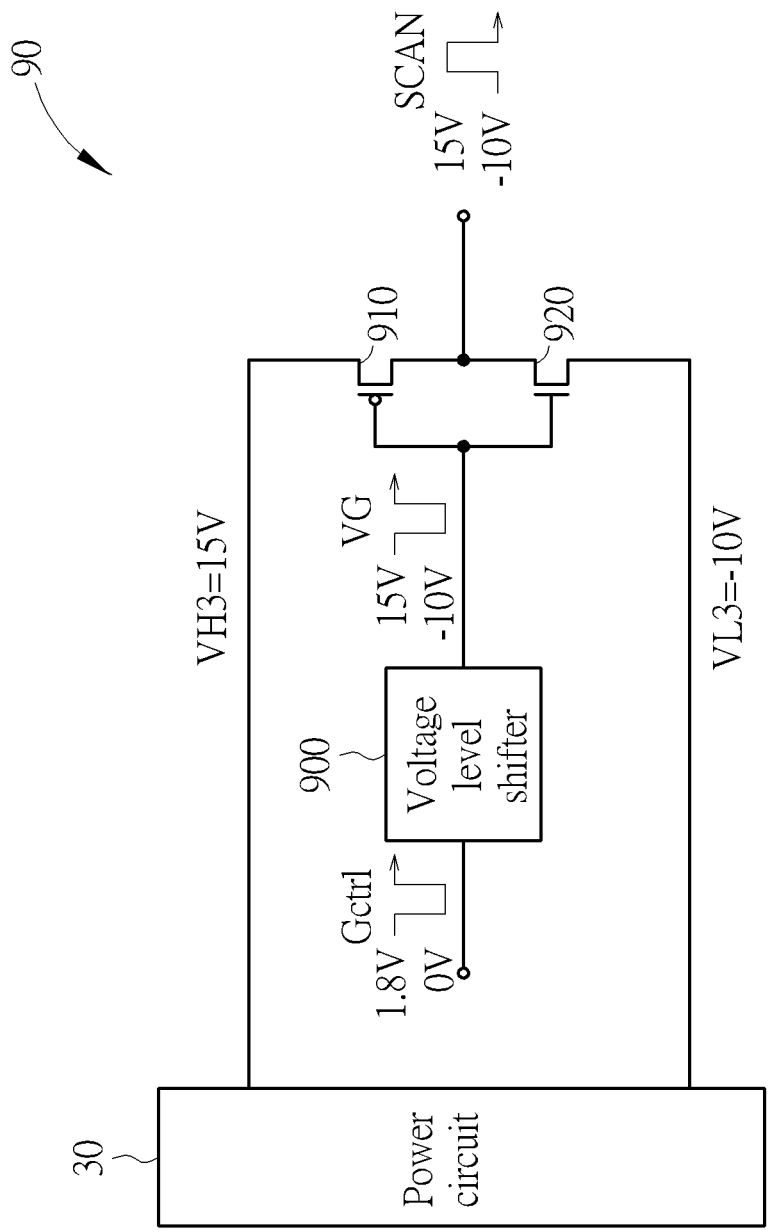
FIG. 12 is a schematic diagram of a gate driving circuit according to an embodiment of the present invention.

In respect of application, the power circuits 30, 80 can be employed in a gate driving circuit of a thin film transistor (TFT) LCD monitor. For example, please refer to FIG. 12, which is a gate driving circuit 90 according to an embodiment of the present invention. The gate driving circuit 90 is utilized for generating a scan signal SCAN outputted to an LCD panel, such as the LCD panel 100 of FIG. 1, according to a gate control signal Gctrl. The scan signal SCAN is utilized for controlling timing of receiving image data for a row of pixels of the LCD panel. The gate driving circuit 90 includes a voltage level shifter 900, a P-type transistor 910, an N-type transistor 920 and the power circuit 30. The voltage level shifter 900 is utilized for shifting the gate control signal Gctrl of 0/1.8 V into a control signal VG of 15/−10 V. The P-type transistor 910 and the N-type transistor 920 together function as an inverter, and are utilized for outputting the third high voltage VH3 or the third low voltage VL3 provided by the power circuit 30 according to the control signal VG. Since the power circuit 30 does not employ any high voltage endurance component, the gate driving circuit 90 costs less and can be manufactured faster in comparison with the prior art.

To sum up, in order to employ less high voltage endurance components, the present invention discloses a multiple stage power circuit structure, which strictly limits the node voltage differences among the employed charge pumps, and converts the supply voltage step by step. As a result, the high voltage endurance component is no longer required for the power circuit, so as to save manufacturing time and cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power circuit, comprising:
   a first charge pump, for converting a supply voltage into a first high voltage and a first low voltage, wherein the first high voltage is equal to the supply voltage plus a first voltage variance, the first low voltage is equal to the supply voltage minus a fourth voltage variance, and a voltage difference between the first high voltage and the first low voltage is less than a medium voltage device endurance limit;
   a second charge pump, electrically coupled to the first charge pump, for enhancing the first high voltage to generate a second high voltage, wherein the second high voltage is equal to the first high voltage plus a second voltage variance; and
   a third charge pump, electrically coupled to the first charge pump, for weakening the first low voltage to generate a second low voltage, wherein the second low voltage is equal to the first low voltage minus a third voltage variance;
   wherein the second voltage variance and the third voltage variance are less than the medium voltage device endurance limit.

2. The power circuit of claim 1, wherein the medium voltage device endurance limit is 6 V.

3. The power circuit of claim 1, wherein the first charge pump comprises:
   an input end, for receiving the supply voltage;
   a first output end, for outputting the first high voltage;
   a second output end, for outputting the first low voltage;
   a first N-type transistor, comprising:
      a source end, electrically coupled to the second output end;
      a gate end, for receiving a first control signal; and
      a drain end;
   a first P-type transistor, comprising:
      a source end, electrically coupled to the input end;
      a gate end, for receiving a second control signal; and
      a drain end, electrically coupled to the drain end of the first N-type transistor;
   a second P-type transistor, comprising:
      a source end;
      a gate end, for receiving a third control signal; and
      a drain end, electrically coupled to the input end;
   a third P-type transistor, comprising:
      a source end, electrically coupled to the first output end;
      a gate end, for receiving the second control signal; and
      a drain end, electrically coupled to the source end of the second P-type transistor;
   a second N-type transistor, comprising:
      a source end, electrically coupled to the second output end;
      a gate end, for receiving a fourth control signal; and
      a drain end;
   a fourth P-type transistor, comprising:
      a source end, electrically coupled to the input end;
      a gate end, for receiving the third control signal; and
      a drain end, electrically coupled to the drain end of the second N-type transistor;
   a fifth P-type transistor, comprising:
      a source end;
      a gate end, for receiving the second control signal; and
      a drain end, electrically coupled to the input end;
   a sixth P-type transistor, comprising:
      a source end, electrically coupled to the first output end;
      a gate end, for receiving the third control signal; and
      a drain end, electrically coupled to the source end of the fifth P-type transistor;
   a first capacitor, comprising:
      a first end, electrically coupled to the drain end of the first P-type transistor; and
      a second end, electrically coupled to the source end of the second P-type transistor;
   a second capacitor, comprising:
      a first end, electrically coupled to the drain end of the fourth P-type transistor; and
      a second end, electrically coupled to the source end of the fifth P-type transistor; and
   a third capacitor, electrically coupled between the first output end and the second output end.

4. The power circuit of claim 1, wherein the second charge pump comprises:
   an input end, for receiving the first high voltage;
   an output end, for outputting the second high voltage;
   a first N-type transistor, comprising:
      a source end;
      a gate end, for receiving a first control signal; and
      a drain end;
   a first P-type transistor, comprising:
      a source end, electrically coupled to the input end;
      a gate end, for receiving a second control signal; and
      a drain end, electrically coupled to the drain end of the first N-type transistor;
   a second P-type transistor, comprising:
      a source end;
      a gate end, for receiving a third control signal; and
      a drain end, electrically coupled to the input end;
   a third P-type transistor, comprising:
      a source end, electrically coupled to the input end;
      a gate end, for receiving a fourth control signal; and
      a drain end, electrically coupled to the source end of the second P-type transistor;
   a second N-type transistor, comprising:
      a source end, electrically coupled to the source end of the first N-type transistor;
      a gate end, for receiving a fifth control signal; and
      a drain end;
   a fourth P-type transistor, comprising:
      a source end, electrically coupled to the input end;
      a gate end, for receiving a sixth control signal; and
      a drain end, electrically coupled to the drain end of the second N-type transistor;
   a fifth P-type transistor, comprising:
      a source end;
      a gate end, for receiving the fourth control signal; and
      a drain end, electrically coupled to the input end;
   a sixth P-type transistor, comprising:
      a source end, electrically coupled to the output end;
      a gate end, for receiving the third control signal; and
      a drain end, electrically coupled to the source end of the fifth P-type transistor;
   a first capacitor, comprising:

a first end, electrically coupled to the drain end of the
first P-type transistor; and
a second end, electrically coupled to the source end of
the second P-type transistor;
a second capacitor, comprising:
a first end, electrically coupled to the drain end of the
fourth P-type transistor; and
a second end, electrically coupled to the source end of
the fifth P-type transistor; and
a third capacitor, electrically coupled between the output
end and the source end of the second N-type transistor.

5. The power circuit of claim 1, wherein the third charge pump comprises:
an input end, for receiving the first low voltage;
an output end, for outputting the second low voltage;
a first N-type transistor, comprising:
a source end, electrically coupled to the output end;
a gate end, for receiving a first control signal; and
a drain end;
a second N-type transistor, comprising:
a source end, electrically coupled to the drain end of the
first N-type transistor;
a gate end, for receiving a second control signal; and
a drain end, electrically coupled to the input end;
a third N-type transistor, comprising:
a source end, electrically coupled to the input end;
a gate end, for receiving a third control signal; and
a drain end;
a first P-type transistor, comprising:
a source end;
a gate end, for receiving a fourth control signal; and
a drain end, electrically coupled to the drain end of the
third N-type transistor;
a fourth N-type transistor, comprising:
a source end, electrically coupled to the output end;
a gate end, for receiving the second control signal; and
a drain end;
a fifth N-type transistor, comprising:
a source end, electrically coupled to the drain end of the
fourth N-type transistor;
a gate end, for receiving the first control signal; and
a drain end, electrically coupled to the input end;
a sixth N-type transistor, comprising:
a source end, electrically coupled to the input end;
a gate end, for receiving a fifth control signal; and
a drain end;
a second P-type transistor, comprising:
a source end, electrically coupled to the source end of
the first P-type transistor;
a gate end, for receiving a sixth control signal; and
a drain end, electrically coupled to the drain end of the
sixth N-type transistor;
a first capacitor, comprising:
a first end, electrically coupled to the source end of the
second N-type transistor; and
a second end, electrically coupled to the drain end of
the third N-type transistor;
a second capacitor, comprising:
a first end, electrically coupled to the source end of the
fifth N-type transistor; and
a second end, electrically coupled to the drain end of
the sixth N-type transistor; and
a third capacitor, electrically coupled between the output
end and the source end of the second P-type transistor.

6. The power circuit of claim 1, wherein the first charge pump comprises:
an input end, for receiving the supply voltage;
a first output end, for outputting the first high voltage;
a second output end, for outputting the first low voltage;
a first N-type transistor, comprising:
a source end, electrically coupled to the second output end;
a gate end, for receiving a first control signal; and
a drain end;
a first P-type transistor, comprising:
a source end, electrically coupled to the input end;
a gate end, for receiving a second control signal; and
a drain end, electrically coupled to the drain end of the
first N-type transistor;
a second P-type transistor, comprising:
a source end;
a gate end, for receiving a third control signal; and
a drain end, electrically coupled to the input end;
a third P-type transistor, comprising:
a source end;
a gate end, for receiving the second control signal; and
a drain end, electrically coupled to the source end of the
second P-type transistor;
a fourth P-type transistor, comprising:
a source end, electrically coupled to the first output end;
a gate end, for receiving the third control signal; and
a drain end, electrically coupled to the source end of the
third P-type transistor;
a second N-type transistor, comprising:
a source end, electrically coupled to the second output end;
a gate end, for receiving a fourth control signal; and
a drain end;
a fifth P-type transistor, comprising:
a source end, electrically coupled to the input end;
a gate end, for receiving the third control signal; and
a drain end, electrically coupled to the drain end of the
second N-type transistor;
a first capacitor, comprising:
a first end, electrically coupled to the drain end of the
first P-type transistor; and
a second end, electrically coupled to the source end of
the second P-type transistor;
a second capacitor, comprising:
a first end, electrically coupled to the drain end of the
fifth P-type transistor; and
a second end, electrically coupled to the source end of
the third P-type transistor; and
a third capacitor, electrically coupled between the first
output end and the second output end.

7. A gate driving circuit, for providing a scan signal to an LCD panel, the gate driving circuit comprising:
a P-type transistor, comprising:
a gate end, for receiving a control signal;
a source end, for receiving a positive supply voltage; and
a drain end, electrically coupled to the LCD panel, for
outputting the scan signal;
an N-type transistor, comprising:
a gate end, for receiving the control signal;
a source end, for receiving a negative supply voltage; and
a drain end, electrically coupled to the drain end of the
P-type transistor; and
a power circuit, comprising:
a first charge pump, for converting a supply voltage
into a first high voltage and a first low voltage,
wherein the first high voltage is equal to the supply
voltage plus a first voltage variance, the first low voltage is equal to the supply voltage minus a fourth voltage variance, and a voltage difference between the first high voltage and the first low voltage is less than a medium voltage device endurance limit;

a second charge pump, electrically coupled to the first charge pump and the source end of the P-type transistor, for enhancing the first high voltage to generate a second high voltage, wherein the second high voltage is equal to the first high voltage plus a second voltage variance; and a third charge pump, electrically coupled to the first charge pump and the source end of the N-type transistor, for weakening the first low voltage to generate a second low voltage, wherein the second low voltage is equal to the first low voltage minus a third voltage variance;

wherein the second voltage variance and the third voltage variance are less than the medium voltage device endurance limit.

8. The gate driving circuit of claim 7, further comprising a voltage level shifter, electrically coupled to the gate end of the P-type transistor and the gate end of the N-type transistor, for shifting a gate control signal to generate the control signal.

9. The gate driving circuit of claim 7, wherein the medium voltage device endurance limit is 6 V.

10. A display module, comprising:
an LCD panel; and
a gate driving circuit, comprising:
  a P-type transistor, comprising:
    a gate end, for receiving a control signal;
    a source end, for receiving a positive supply voltage; and
    a drain end, electrically coupled to the LCD panel, for outputting a scan signal to the LCD panel;
  an N-type transistor, comprising:
    a gate end, for receiving the control signal;
    a source end, for receiving a negative supply voltage; and
    a drain end, electrically coupled to the drain end of the P-type transistor; and
  a power circuit, comprising:
    a first charge pump, for converting a supply voltage into a first high voltage and a first low voltage, wherein the first high voltage is equal to the supply voltage plus a first voltage variance, the first low voltage is equal to the supply voltage minus a fourth voltage variance, and a voltage difference between the first high voltage and the first low voltage is less than a medium voltage device endurance limit;
    a second charge pump, electrically coupled to the first charge pump and the source end of the P-type transistor, for enhancing the first high voltage to generate a second high voltage, wherein the second high voltage is equal to the first high voltage plus a second voltage variance; and
    a third charge pump, electrically coupled to the first charge pump and the source end of the N-type transistor, for weakening the first low voltage to generate a second low voltage, wherein the second low voltage is equal to the first low voltage minus a third voltage variance;
  wherein the second voltage variance and the third voltage variance are less than the medium voltage device endurance limit.

11. The display module of claim 10, wherein the medium voltage device endurance limit is 6 V.

* * * * *